(12) United States Patent
Byrne

(10) Patent No.: US 10,788,268 B2
(45) Date of Patent: *Sep. 29, 2020

(54) AIR-COOLED HEAT TRANSFER DEVICE WITH INTEGRATED AND MECHANIZED AIR PRE-COOL SYSTEM

(71) Applicant: Evapco, Inc., Taneytown, MD (US)

(72) Inventor: Tom Byrne, Aalborg (DK)

(73) Assignee: Evapco, Inc., Taneytown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,134

(22) Filed: Sep. 19, 2018

(65) Prior Publication Data

US 2019/0137183 A1  May 9, 2019

Related U.S. Application Data

(60) Provisional application No. 62/560,294, filed on Sep. 19, 2017.

(51) Int. Cl.
| | | |
|---|---|---|
| *F28C 1/14* | (2006.01) | |
| *F28F 13/00* | (2006.01) | |
| *F28F 25/04* | (2006.01) | |
| *F28B 1/06* | (2006.01) | |
| *F28D 5/00* | (2006.01) | |

(52) U.S. Cl.
CPC .............. *F28C 1/14* (2013.01); *F28B 1/06* (2013.01); *F28D 5/00* (2013.01); *F28F 13/003* (2013.01); *F28F 25/04* (2013.01)

(58) Field of Classification Search
CPC ...... F28C 1/14; F28B 1/06; F28D 5/00; F28F 13/003; F28F 25/04
See application file for complete search history.

(56) References Cited

U.S. PATENT DOCUMENTS

| | | | | | |
|---|---|---|---|---|---|
| 3,831,667 | A | * | 8/1974 | Kilgore | F01K 9/003 165/96 |
| 3,994,999 | A | * | 11/1976 | Phelps | F28C 1/00 261/159 |
| 4,119,140 | A | * | 10/1978 | Cates | F28B 1/06 165/115 |
| 4,202,085 | A | * | 5/1980 | Vollmer | F22B 37/206 269/287 |
| 4,315,873 | A | * | 2/1982 | Smith | F28C 1/14 261/158 |
| 6,070,860 | A | * | 6/2000 | Kinney, Jr. | F28C 1/04 261/109 |

(Continued)

FOREIGN PATENT DOCUMENTS

EP  1698847 A1 * 9/2006 ............ F28F 27/003

OTHER PUBLICATIONS

"How cooling towers work" Cooling Tower Products published Apr. 28, 2016 accessed at https://web.archive.org/web/20160429155343/ https://www.coolingtowerproducts.com/blog/how-cooling-towers-work-diagram-pictures-2015.htm> (Year: 2016).*

(Continued)

*Primary Examiner* — Stephen Hobson
(74) *Attorney, Agent, or Firm* — Whiteford, Taylor & Preston, LLP; Peter J. Davis

(57) ABSTRACT

A once-through dry adiabatic cooler having an integrated factory installed air pre-cooler system that is mechanized to move from a shipping position to an operational position.

2 Claims, 18 Drawing Sheets

(56) References Cited

U.S. PATENT DOCUMENTS

| | | | | |
|---|---|---|---|---|
| 6,213,200 B1* | 4/2001 | Carter | ............. | F28C 1/14 |
| | | | | 165/110 |
| 7,128,310 B2* | 10/2006 | Mockry | ............. | F28C 1/14 |
| | | | | 261/112.1 |
| 7,887,030 B2* | 2/2011 | Hentschel | ............. | F28C 1/04 |
| | | | | 165/900 |
| 8,966,924 B2* | 3/2015 | Pichai | ............. | F28C 1/14 |
| | | | | 62/310 |
| 9,057,563 B2* | 6/2015 | Carter | ............. | F28C 1/14 |
| 9,091,485 B2* | 7/2015 | Bugler, III | ............. | F28C 1/14 |
| 9,243,847 B2* | 1/2016 | Benz | ............. | F28B 1/06 |
| 9,453,687 B2* | 9/2016 | Kwon | ............. | F28D 15/02 |
| 9,612,025 B2* | 4/2017 | Wong | ............. | F28F 1/12 |
| 9,694,452 B2* | 7/2017 | Karamanos | ............. | F24F 1/0059 |
| 10,175,002 B2* | 1/2019 | Dalton | ............. | F28D 5/02 |
| 10,254,057 B2* | 4/2019 | Speckin | ............. | F28C 1/00 |
| 10,408,541 B2* | 9/2019 | Seawell | ............. | F28C 1/14 |
| 2005/0012230 A1 | 1/2005 | Kammerzell et al. | | |
| 2007/0187851 A1* | 8/2007 | Facius | ............. | F28F 25/12 |
| | | | | 261/161 |
| 2009/0115080 A1 | 5/2009 | Dorin et al. | | |
| 2010/0162737 A1 | 7/2010 | Hall et al. | | |
| 2010/0258275 A1 | 10/2010 | Koenig et al. | | |
| 2011/0120171 A1 | 5/2011 | Cho et al. | | |
| 2011/0197618 A1* | 8/2011 | Kohler | ............. | F25B 40/02 |
| | | | | 62/314 |
| 2013/0292103 A1* | 11/2013 | Eindhoven | ............. | B23P 15/26 |
| | | | | 165/173 |
| 2015/0204626 A1* | 7/2015 | Martell | ............. | F28F 27/003 |
| | | | | 165/200 |
| 2015/0330710 A1* | 11/2015 | Curtis | ............. | F28F 25/02 |
| | | | | 261/29 |
| 2016/0069577 A1 | 3/2016 | Dinnage | | |
| 2017/0051980 A1* | 2/2017 | Singh | ............. | F28B 1/06 |
| 2017/0146298 A1* | 5/2017 | Maurer | ............. | B01F 3/04 |
| 2017/0261274 A1 | 9/2017 | Kocher et al. | | |
| 2018/0283792 A1* | 10/2018 | Shin | ............. | F28C 1/14 |
| 2018/0283814 A1* | 10/2018 | Najafifard | ............. | F28B 1/06 |
| 2019/0170459 A1* | 6/2019 | Rasmussen | ............. | F28F 25/10 |

OTHER PUBLICATIONS

International Search Report issued in copending International Application No. PCT/18/51822 dated Dec. 21, 2018.

* cited by examiner

AIR-COOLED HEAT TRANSFER DEVICE WITH INTEGRATED AND MECHANIZED AIR PRE-COOL SYSTEM

BACKGROUND OF THE INVENTION

Field of the Invention

The present invention relates to air-cooled heat transfer equipment.

Description of the Background

Air-cooled heat exchangers remove heat from a working fluid by transferring that heat to the air. Air-cooled heat exchangers typically consist of tubes connected to fins. The working fluid is sent through the inside of the tubes and the heat is conducted to the outside of the tubes and the fins. Air passing over the fins and tubes removes this heat; one or more fans are generally used to move the air. The working fluid can be a liquid, a gas, a condensing refrigerant, or any other fluid that needs to have heat removed. The tubes are typically constructed of copper, aluminum, or stainless steel but other metals and non-metals have been used. Fins are typically made from copper or aluminum but other thermally conductive materials have been used.

For heat to be removed from the working fluid, the temperature of the working fluid must be greater than the temperature of the air. The greater the temperature difference between the air and the working fluid the less is needed to remove the heat; hence the less fan horsepower is needed to move the air.

A known way to lower the ambient air temperature is by adiabatic cooling. With adiabatic cooling an amount of water is either sprayed in the air or over some open-mesh panels. The water evaporates and cools the air with the air dry-bulb temperature approaching the wet-bulb temperature. The adiabatically-cooled air will have a higher humidity level and a lower dry-bulb temperature than the untreated air. A lower dry-bulb temperature will allow cooling at a lower airflow or cooling the working fluid to a lower temperature both of which are desirable effects.

There are various approaches for adiabatic cooling of air-cooled heat-exchangers. In one method the incoming ambient air passes through pre-cooling system featuring an open-mesh panel that has been saturated with water. The panel can be saturated by a drip-feed, spray, or other method to saturate the panel. The water evaporates as the air passes through the panel cooling the incoming air. There are many variations on the type and location of these panels but all have the incoming air passing through a water saturated panel.

These pre-cooling systems are often supplied after-market and are always shipped separately from the air cooled systems to which they are coupled and therefore require field installation.

SUMMARY OF THE INVENTION

The present invention features an air cooled heat transfer device including a factory installed air pre-cooling system coupled to and integrated with the primary air-cooled heat transfer equipment, and further including a mechanism for shifting the air pre-cooling system from a shipping position to an operational position.

The invention eliminates separation between the primary heat transfer equipment and the air precooled system prior to shipment while keeping the equipment within legal shipping dimensions which in turn significantly reduces equipment installation effort.

The factory assembled air cooled heat transfer device including integrated air pre-cooling system preferably includes the following primary components to facilitate proper operation and ensure non-permit shipping dimensions: pivoting water distribution header, removable water distribution and adiabatic pads, adjustable incremental framing, incremental adiabatic pad support angles, dual-function drip tray/adiabatic pad bottom support, multi-functional drip pan, and adiabatic base frame support/unit structural enhancement.

The present integrated air pre-cooling system and air-cooled heat transfer device of the invention allows an air cooled system to operate at the same ambient dry bulb temperature in comparison to non-pre-cooled air equipment while achieving significantly higher heat rejection capability. Alternately, air cooled heat transfer equipment with an air pre-cooling system, can provide equivalent heat rejection while operating at a significantly higher ambient dry bulb temperature.

DETAILED DESCRIPTION

Figure 1:
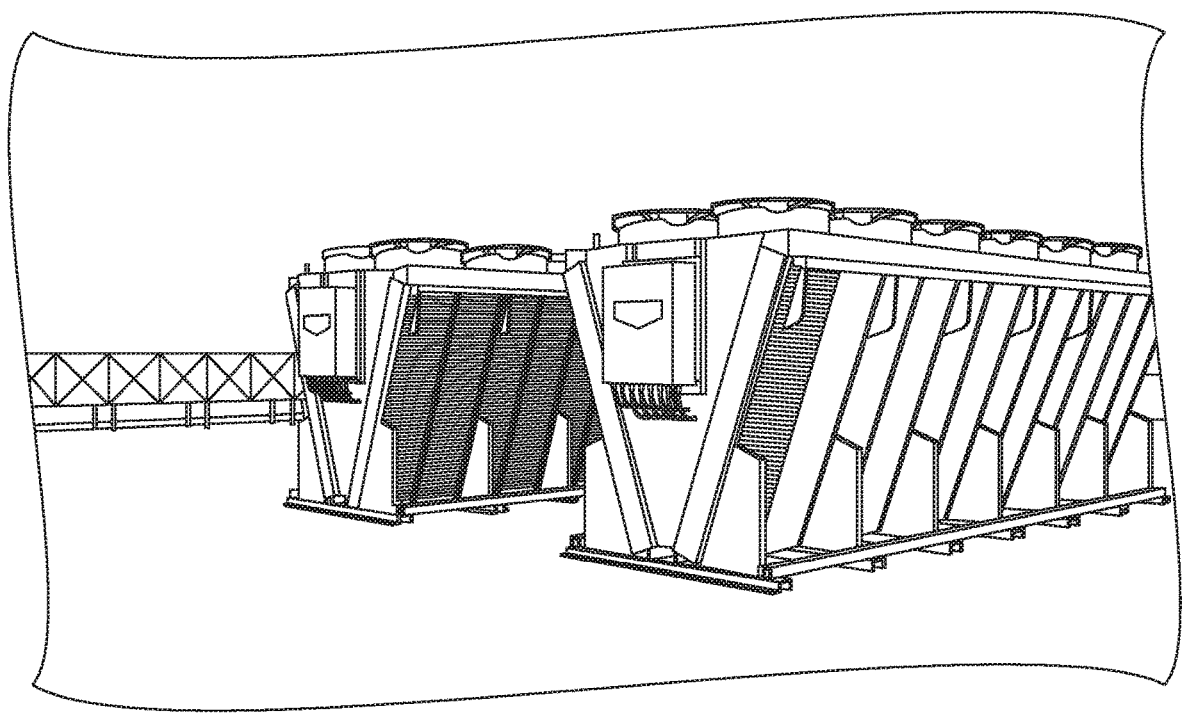
FIG. 1 is a perspective view of two V-type air cooled heat exchangers of the type that might be used in connection with the present invention.
Figure 2:
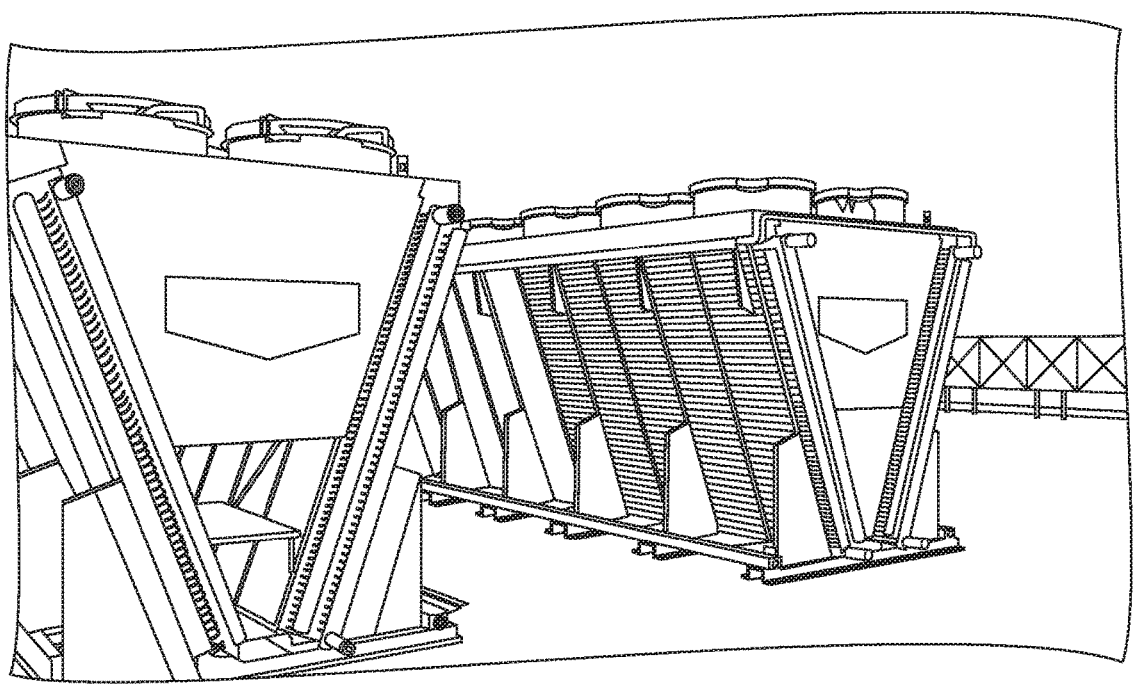
FIG. 2 is a close up perspective view of the opposite ends of the two V-type air cooled heat exchangers shown in FIG. 1.

An example of a V-shaped cooler is shown in FIGS. 1 and 2. A frame supports two coil bundles each comprising a plurality of horizontally arranged finned tubes in a V-shaped configuration. At one end of each tube bundle, the tubes are connected at an inlet end to an inlet header and to an outlet header. At an opposite end of each bundle, each horizontal tube is connected to an adjacent horizontal tube via a return bend. A hot process fluid enters the inlet header via an inlet header connection and is then distributed to the tubes from the inlet header. Cooled fluid exits the tubes via an outlet header and returned to the process/system that headed the fluid. The frame supports a plurality of fans at the top of the cooler and draws ambient air into the unit past the tubes and the fins and out the top of the unit.

Figure 3:
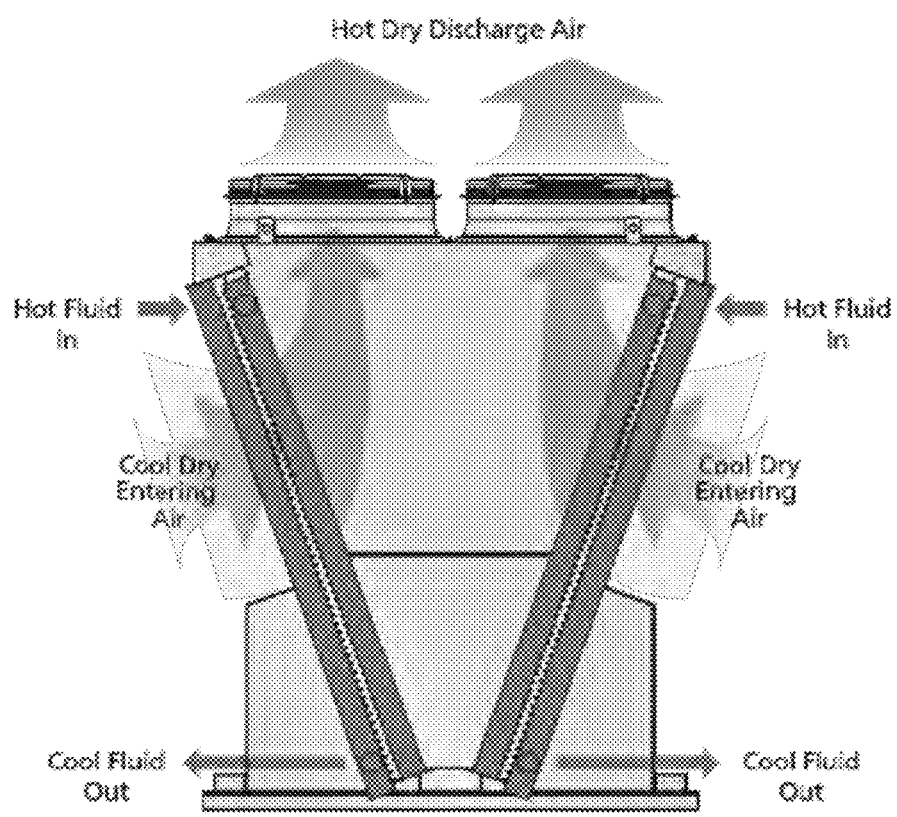
FIG. 3 is a representation of the operation of a V-type air cooled heat exchanger of the type shown in FIGS. 1 and 2.

The principles of operation of a V-shaped air-cooled heat exchanger of the type shown in FIGS. 1 and 2 is shown in FIG. 3. Hot process fluid, shown in red, enters the inlet header via the inlet header connection. From the inlet header, the hot process fluid travels transversely across the heat exchanger, generally parallel to the horizontal. Heat from the process fluid dissipates through the coil tubes surface and out to the fins (not shown). Ambient air is drawn over the coil surface by the fans located at the top of the unit. Heat from the process fluid transfers to the air and discharged to the atmosphere. Cool process fluid, shown in blue, exits the unit through the outlet headers.

Figure 4:
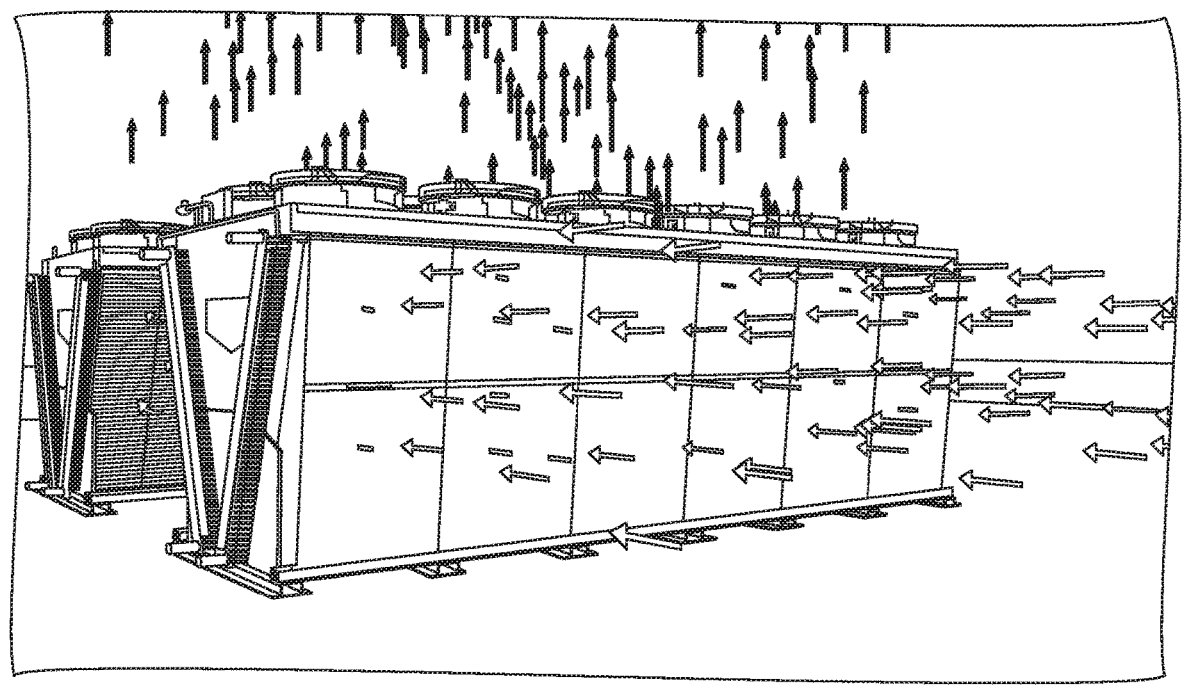
FIG. 4 shows a perspective view of two V-type air cooled heat exchangers on which adiabatic pads have been provided after market and site-mounted for pre-cooling the incoming air.
Figure 5:
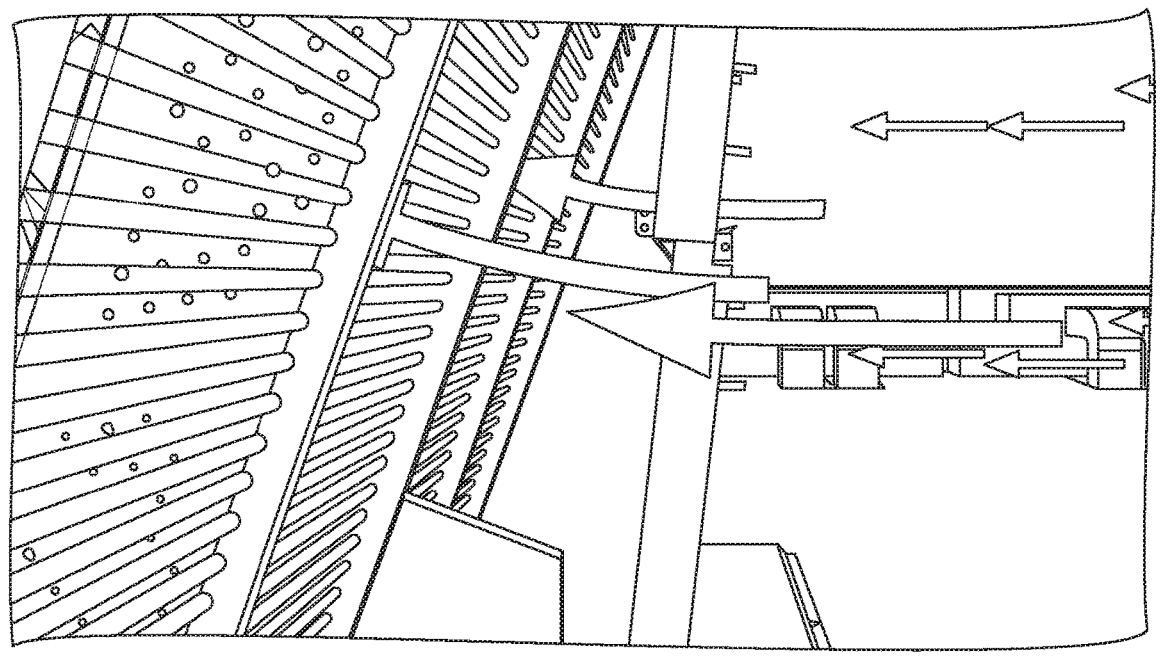
FIG. 5 shows a close-up side cutaway view of one of the V-type air cooled heat exchangers shown in FIG. 3.

An example of a V-shaped cooler with adiabatic pre-cooling pads is shown in FIGS. 4 and 5. A frame supports two coil bundles each comprising a plurality of horizontally arranged finned tubes in a V-shaped configuration. At one end of each tube bundle, the tubes are connected at an inlet end to an inlet header and to an outlet header. At an opposite end of each bundle, each horizontal tube is connected to an adjacent horizontal tube via a return bend. A hot process fluid enters the inlet header via an inlet header connection and is then distributed to the tubes from the inlet header. Cooled fluid exits the tubes via an outlet header and returned to the process/system that headed the fluid. Adiabatic pads are mounted along and spanning both sides of the unit left-to-right and top-to-bottom. A water distribution system drips water onto the top of the pads to saturate them. Water that is not evaporated from the pads is collected at the bottom of the unit and either send to drain or recirculated back to the top of the unit and returned to the pads. The frame supports a plurality of fans at the top of the cooler and draws ambient air into the unit through the saturated pads, past the tubes and the fins and out the top of the unit.

Figure 6:
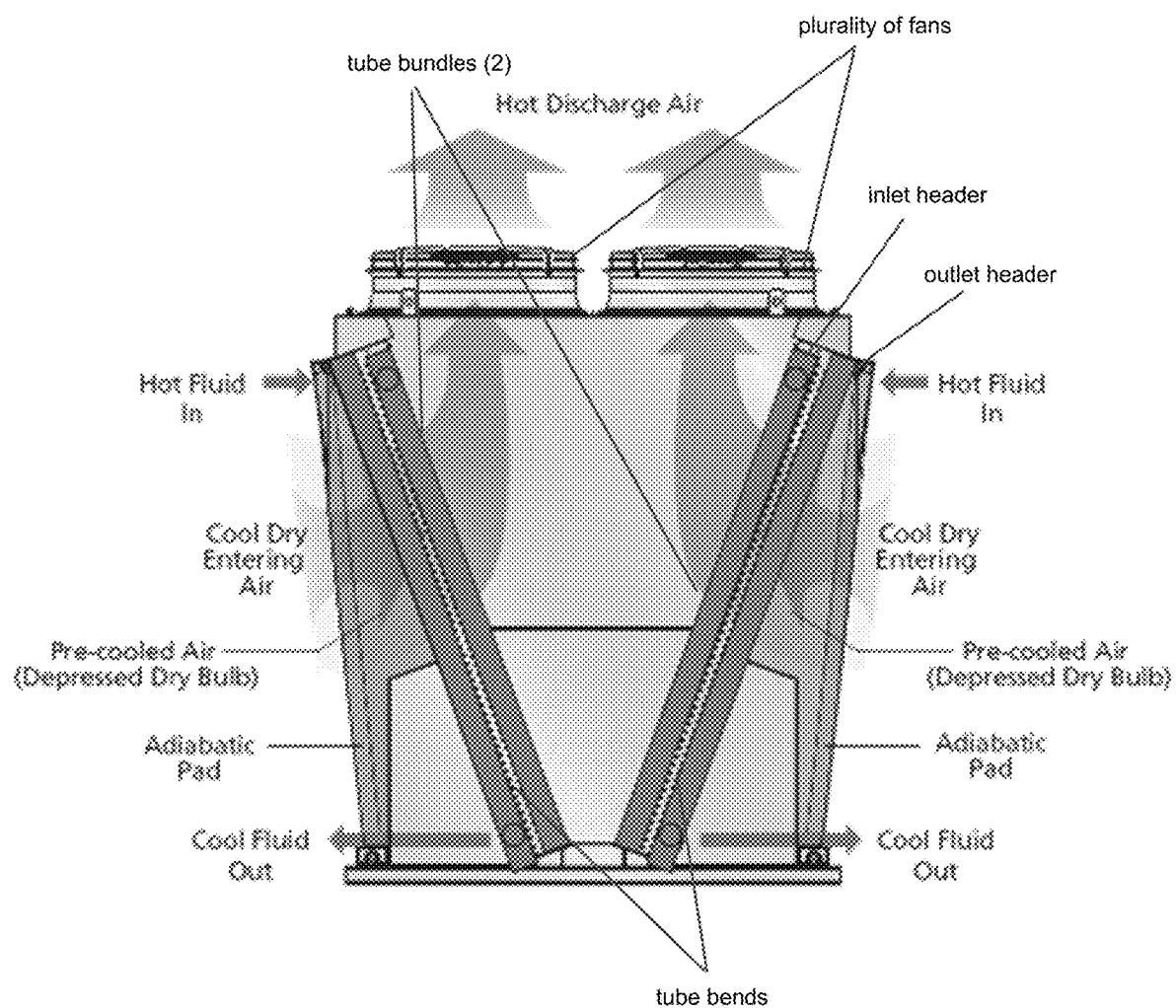
FIG. 6 is a representation of the operation of the V-type air cooled heat exchanger with adiabatic pre-cooling shown in FIGS. 4 and 5.

The principles of operation of a V-shaped air-cooled heat exchanger with adiabatic pads for pre-cooling the incoming air is shown in FIG. 6. Hot process fluid, shown in red, enters the inlet header via the inlet header connection. From the inlet header, the hot process fluid travels transversely across the heat exchanger, generally parallel to the horizontal. Heat from the process fluid dissipates through the coil tubes surface and out to the fins (not shown). The adiabatic system involves fully wetting a fibrous pad located in front of the coil. Ambient air is drawn through the adiabatic pre-cooling pad by the fans located on top of the unit. The air is humidified as it passes through the adiabatic pad, decreasing the dry bulb temperature within a few degrees of the wet bulb temperature. This new air temperature is referred to as the depressed dry bulb. This pre-cooled air is then drawn through the tube and fin surface, offering a substantial increase in heat rejection capability. Heat from the process fluid transfers to the air and discharged to the atmosphere. Cool process fluid, shown in blue, exits the unit through the outlet headers. In a recirculating water system, the water used to wet the adiabatic pads and which is not evaporated is collected at the bottom of the unit and recirculated to a water distribution system at the top of the pad. In a once-through water system, the water used to wet the adiabatic pads and which is not evaporated is collected and sent to a drain.

Figure 7:
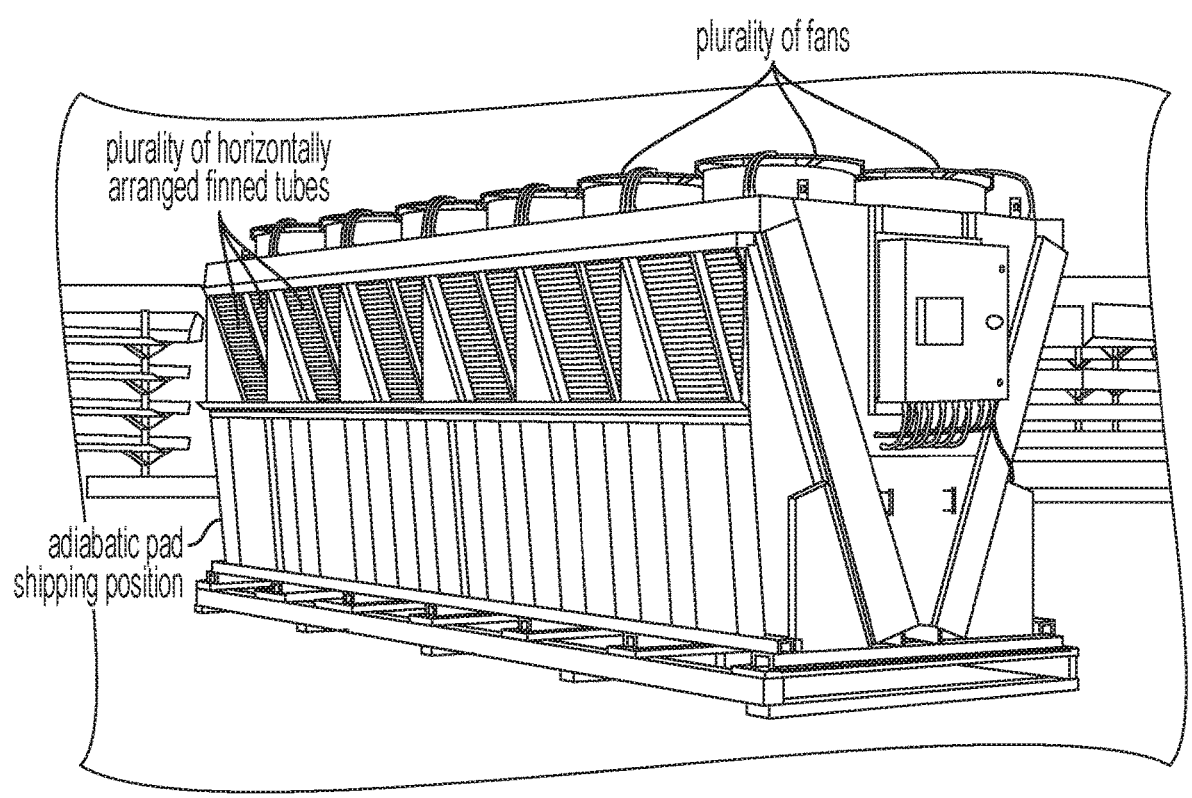
FIG. 7 is a perspective view of an integrated factory assembled integrated air pre-cool system and air-cooled heat transfer device according to an embodiment of the invention with the air pre-cool system in the retracted/shipping position.
Figure 20:
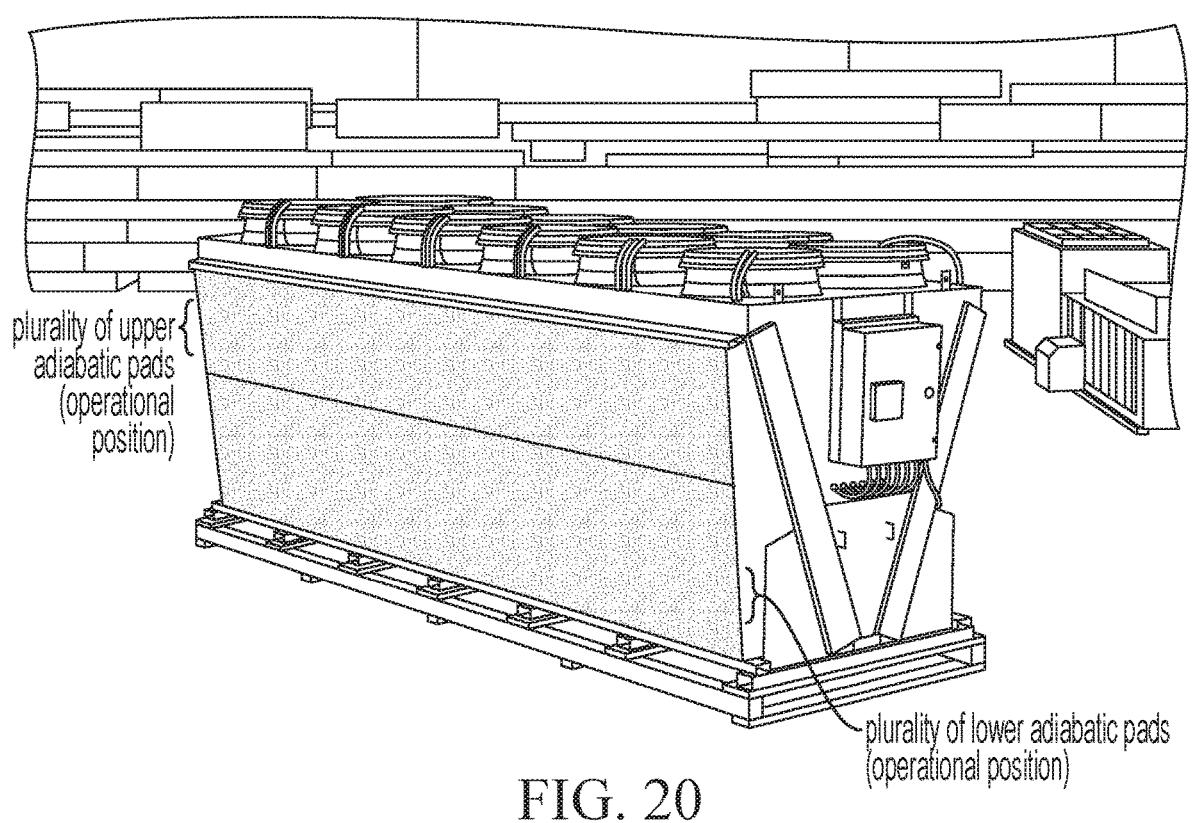
FIG. 20 is a perspective view of an integrated factory assembled air pre-cool system and air-cooled heat transfer device according to an embodiment of the invention with the air pre-cool system in the fully deployed/operational position.

An example of an embodiment of the invention including a V-shaped air-cooled heat exchanger with integrated factory installed air pre-cooling system is shown in FIGS. 7 and 20. FIG. 7 shows the air pre-cooling system in the retracted position for shipping, and FIG. 20, shows the air pre-cooling system in the fully deployed operational position.

Figure 8:
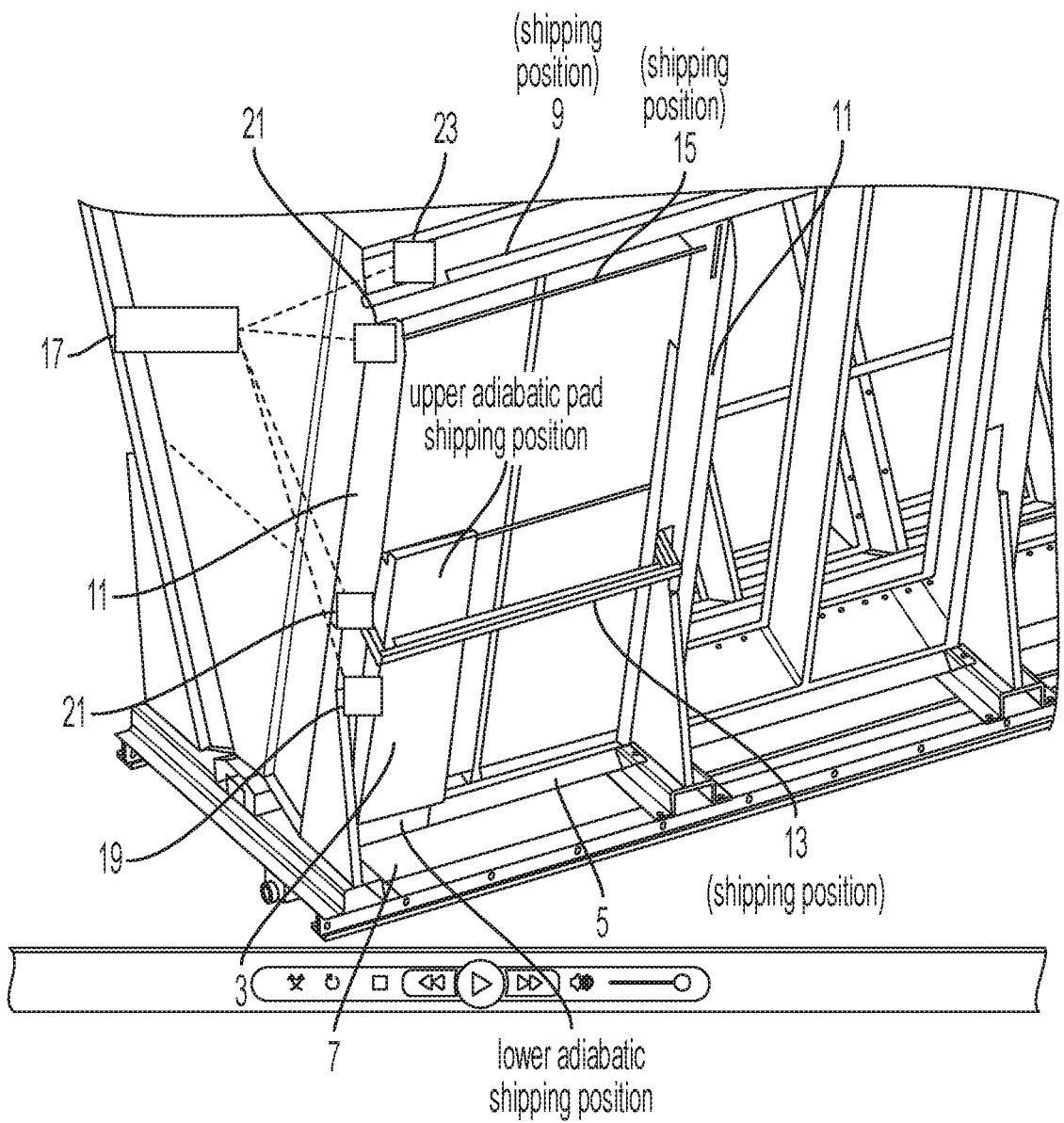
FIG. 8 shows a close-up perspective view of an embodiment of the invention with the air pre-cool system in the retracted/shipping position.

FIG. 8 shows a close-up perspective view of an embodiment of the invention with the integrated air pre-cool system in the retracted/shipping position. Removable water distribution and adiabatic pads 3 are shown resting on dual-function drip tray/adiabatic pad bottom support 5, just above multi-functional drip pan 7. Pivoting water distribution header/tube 9 is pivotally attached to the frame of the V-shaped air-cooled heat exchanger. The integrated air pre-cool system also includes framing 11 attached to the frame of the V-shaped air-cooled heat exchanger, pivoting intermediate adiabatic support element 13 and translatable top adiabatic support element 15.

When the device is ready to be shipped, all the adiabatic pads are in the position shown in FIG. 8, with respective top and bottom pads 3 lying/stacked flat against one-another, with the top pad in front of/external to the bottom pad. The water distribution tube 9 is in the retracted position, folded against the frame of the V-shaped air-cooled heat exchanger. The top adiabatic support element 15 is in the retracted/down position, and the intermediate support element 13 is in the down/retracted position. According to an alternative embodiment, the top adiabatic support element 15 may be in the deployed/top position (see, e.g., FIG. 16). The device is shipped in this position.

Figure 9:
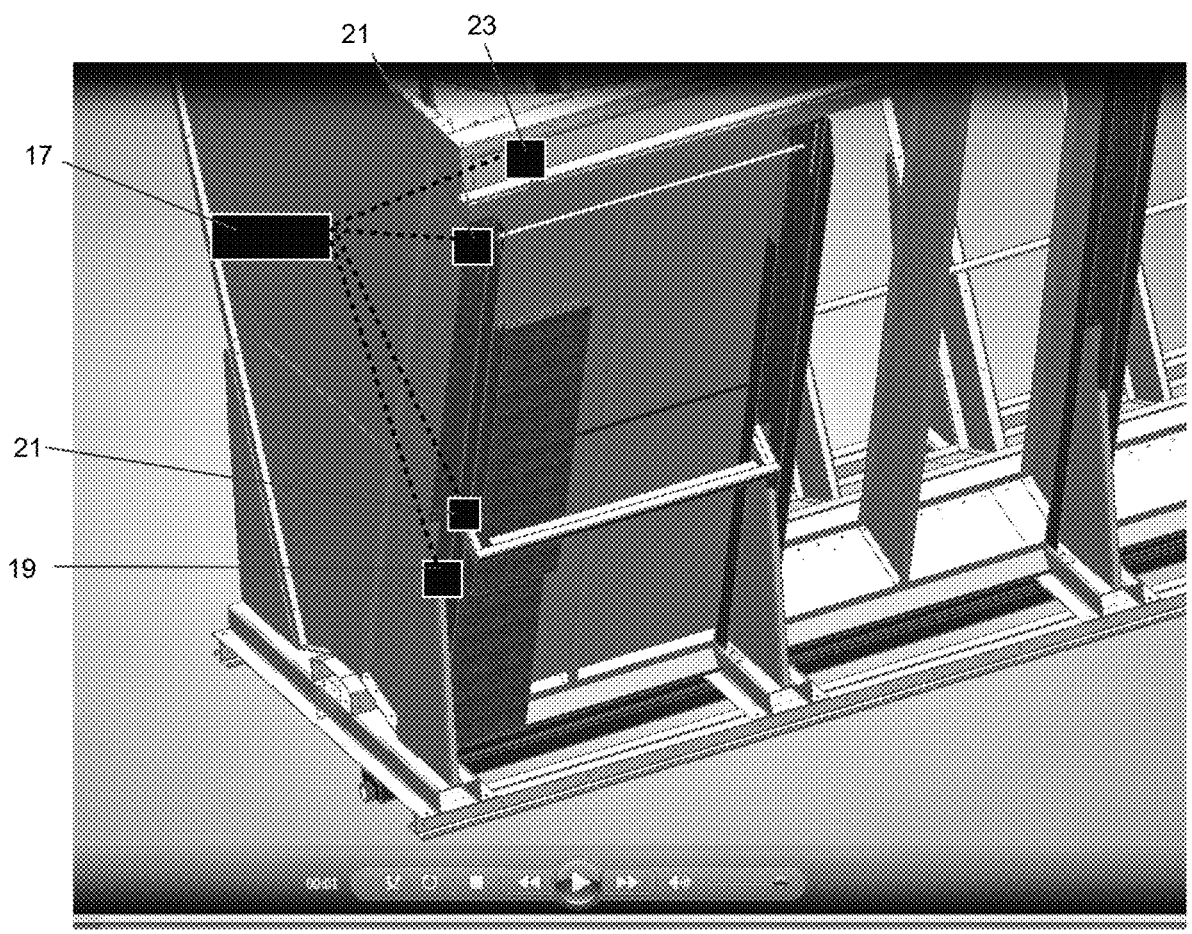
FIG. 9 shows a close-up perspective view of an embodiment of the invention with the air pre-cool system in a first partially deployed position.

When the device has arrived at its installation site, the deployment/positioning control system 17 is activated by an operator/installation technician causing the elements of the pre-cooling system are automatically moved sequentially into a fully deployed operational configuration. FIG. 9 shows the first step of this process in which the top adiabatic pad is raised towards the operation position by a adiabatic pad positioning mechanism 19. At this stage, the water distribution tube 9 and intermediate support element 13 remain in the retracted position. The top adiabatic support element 15 remains in the shipping position, whether in the lowered position or in the final position.

Figure 10:
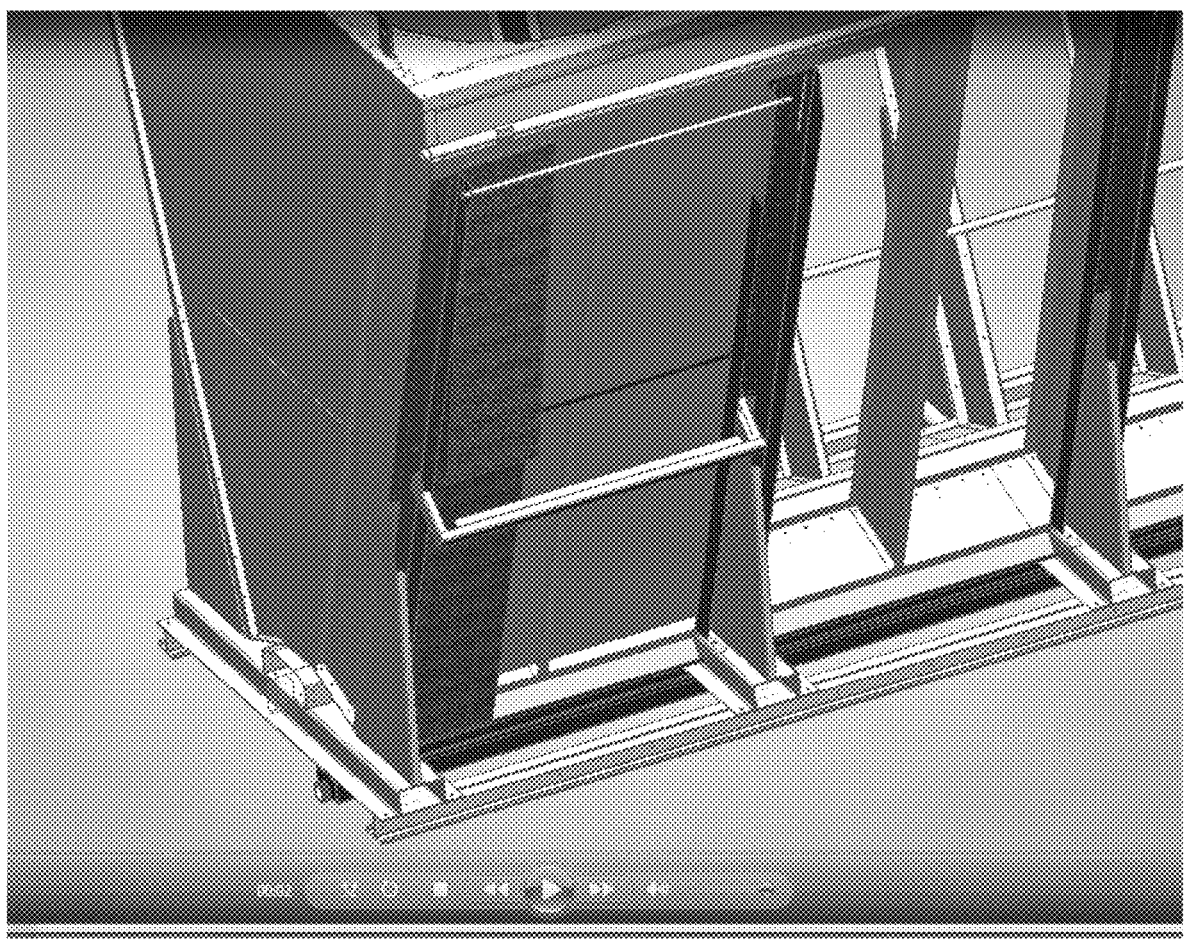
FIG. 10 shows a close-up perspective view of an embodiment of the invention with the air pre-cool system in a second partially deployed position.
Figure 11:
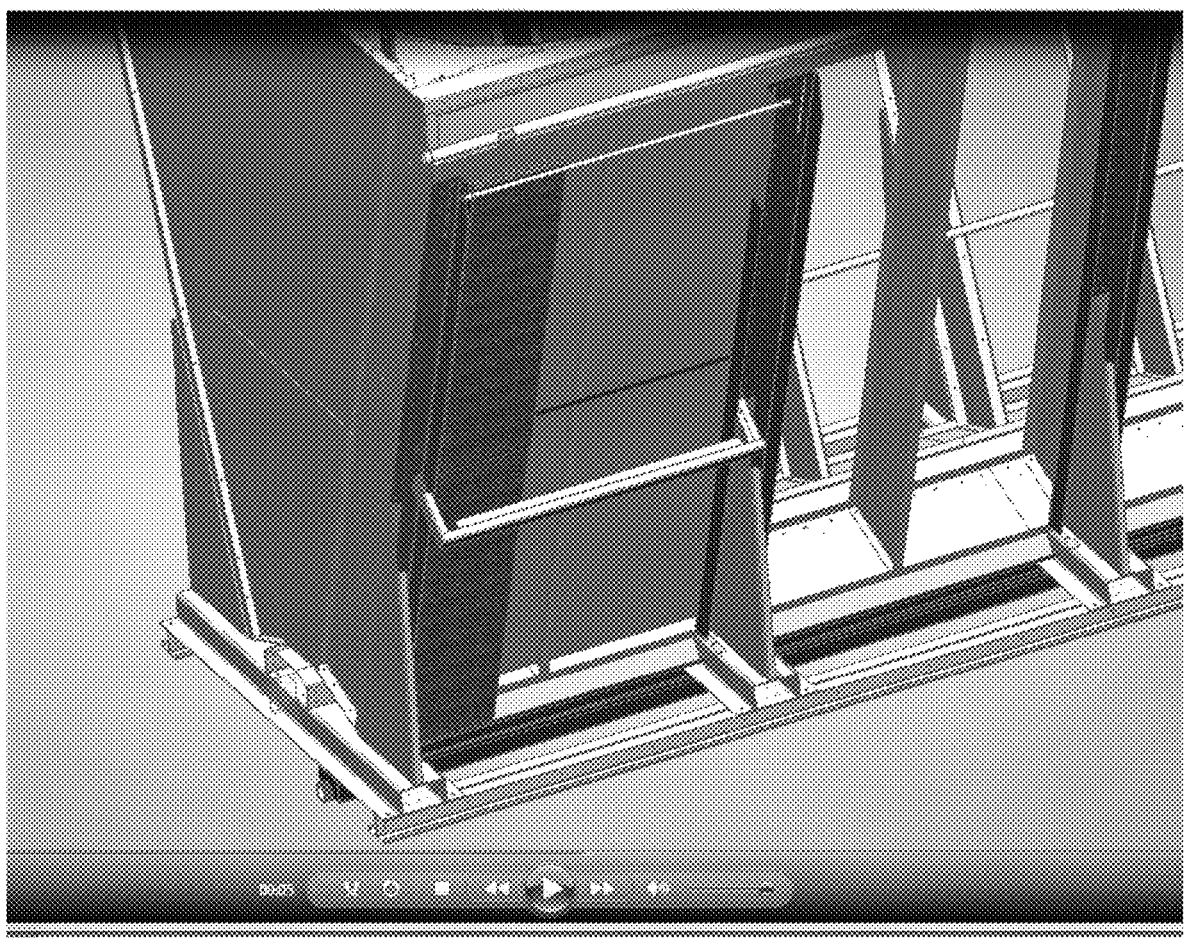
FIG. 11 shows a close-up perspective view of an embodiment of the invention with the air pre-cool system in a third partially deployed position.

FIG. 10 shows the top adiabatic pad beginning to move into final position, with the remaining elements of the pre-cool system in their shipping state. While the figures show only one set of top pads moving into deployment configuration, in actual operation, all top pads are moved simultaneously into deployed/operational configuration. FIG. 11 shows the top adiabatic pad moved into its final and operational location/configuration.

Figure 12:
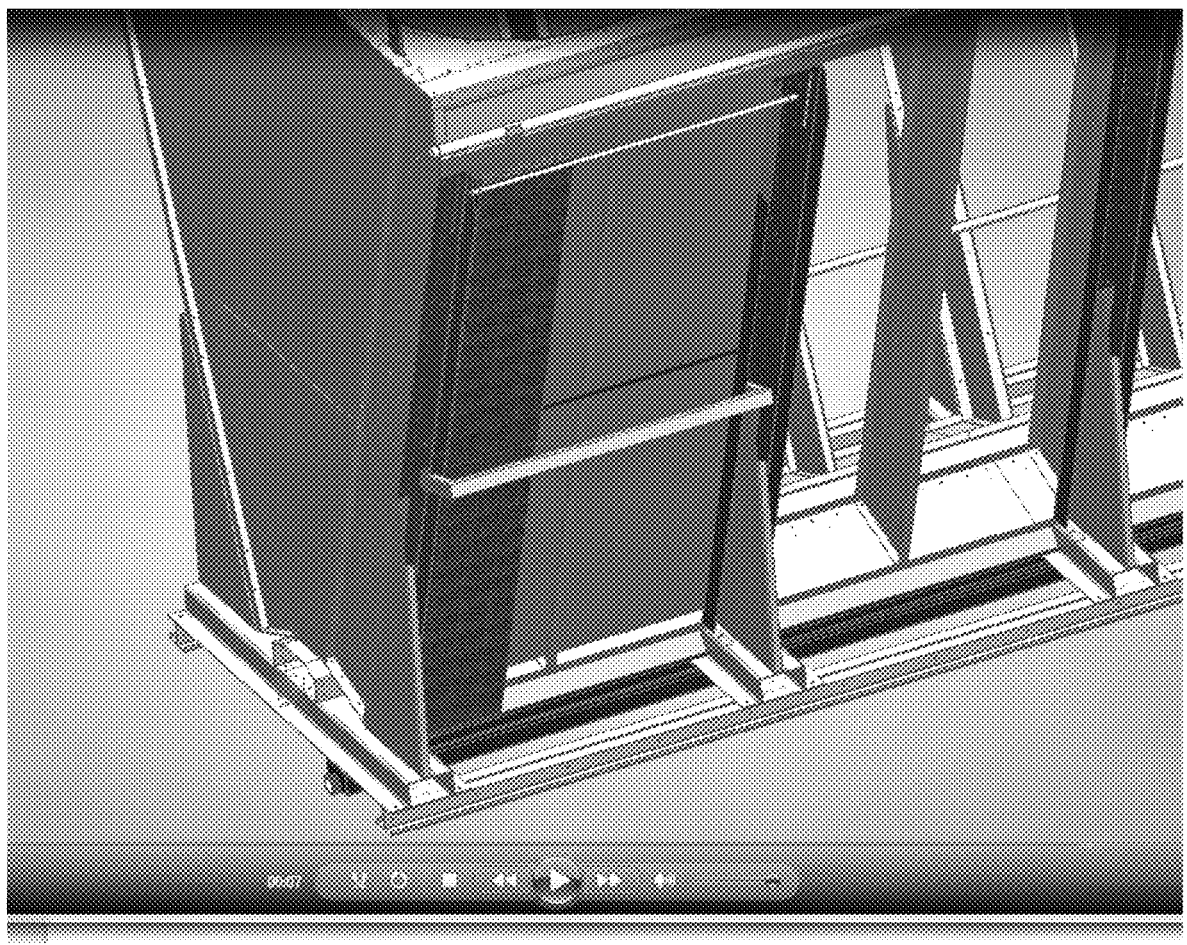
FIG. 12 shows a close-up perspective view of an embodiment of the invention with the air pre-cool system in a fourth partially deployed position.
Figure 13:
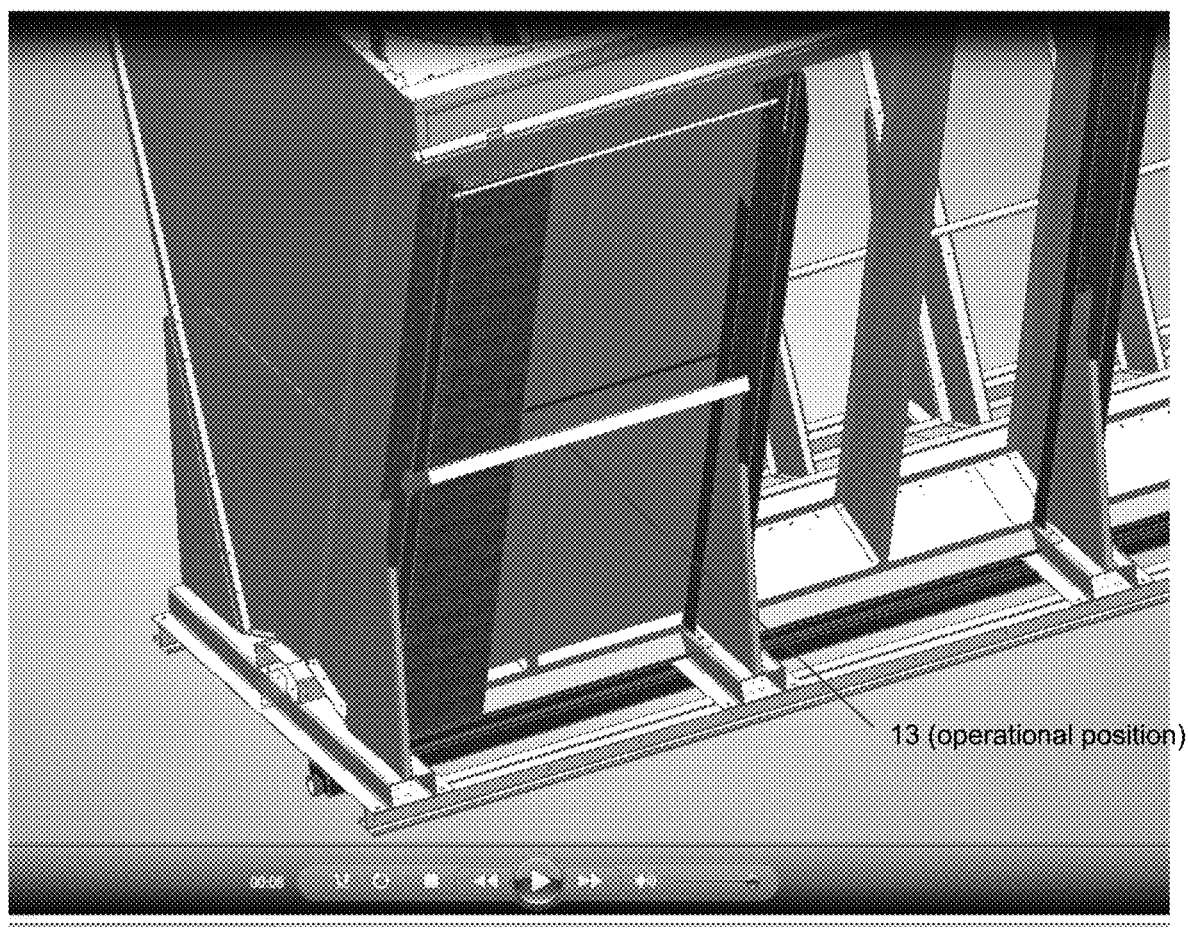
FIG. 13 shows a close-up perspective view of an embodiment of the invention with the air pre-cool system in a fifth partially deployed position.

When the top pads have moved into their final location, the intermediate pad support elements are automatically raised towards their final operational configuration by pad support element positioning mechanisms 21, see FIG. 12 (intermediate pad support element moving towards final operational configuration) and FIG. 13 (intermediate pad support element arrived at final operational configuration).

Figure 14:
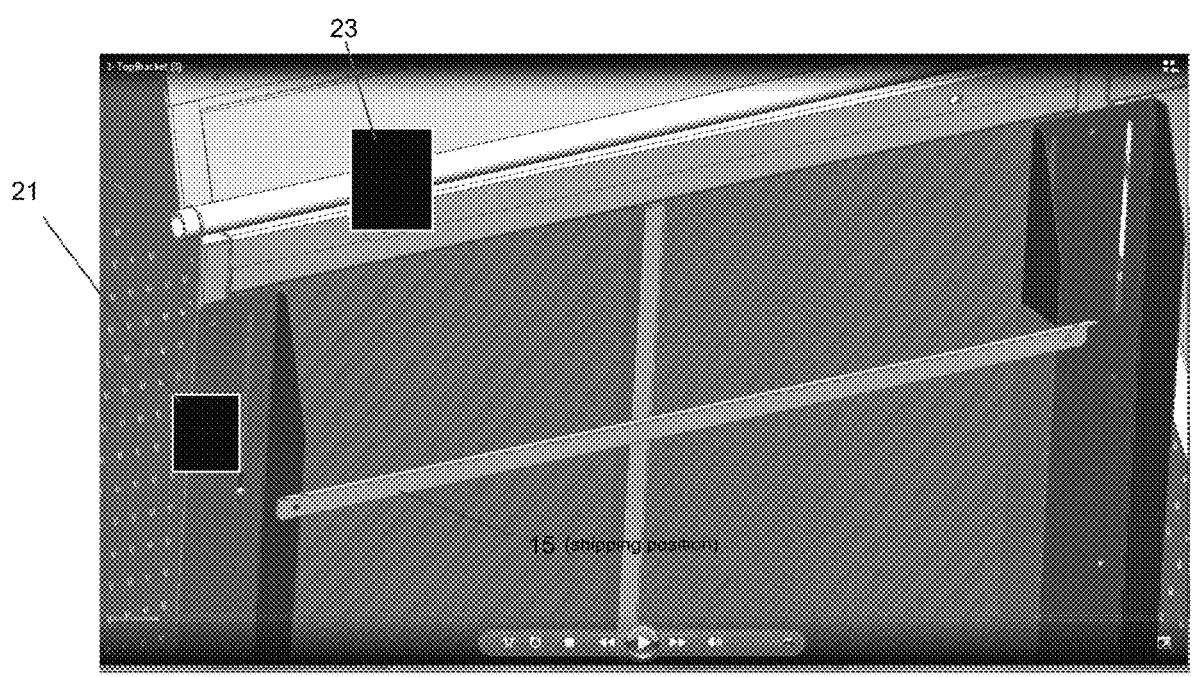
FIG. 14 shows a tighter close-up perspective view of an embodiment of the invention with the top bracket of the air pre-cool system in the retracted position.
Figure 15:
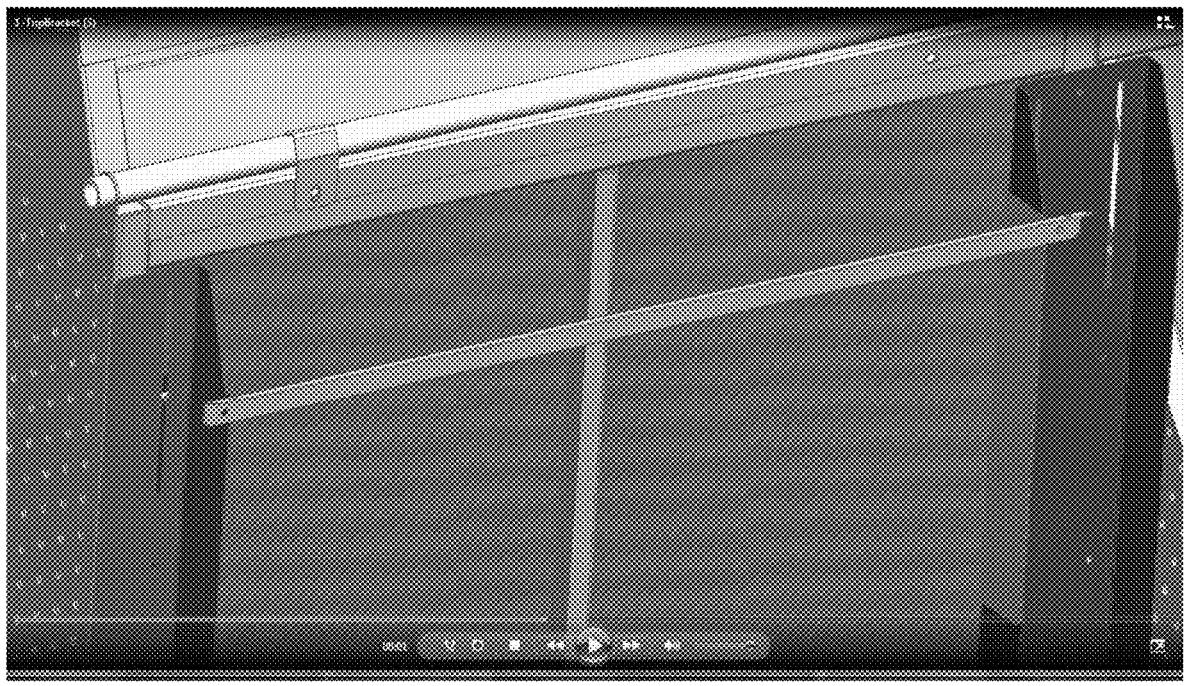
FIG. 15 shows a tighter close-up perspective view of an embodiment of the invention with the top bracket of the air pre-cool system in a partially deployed position.
Figure 16:
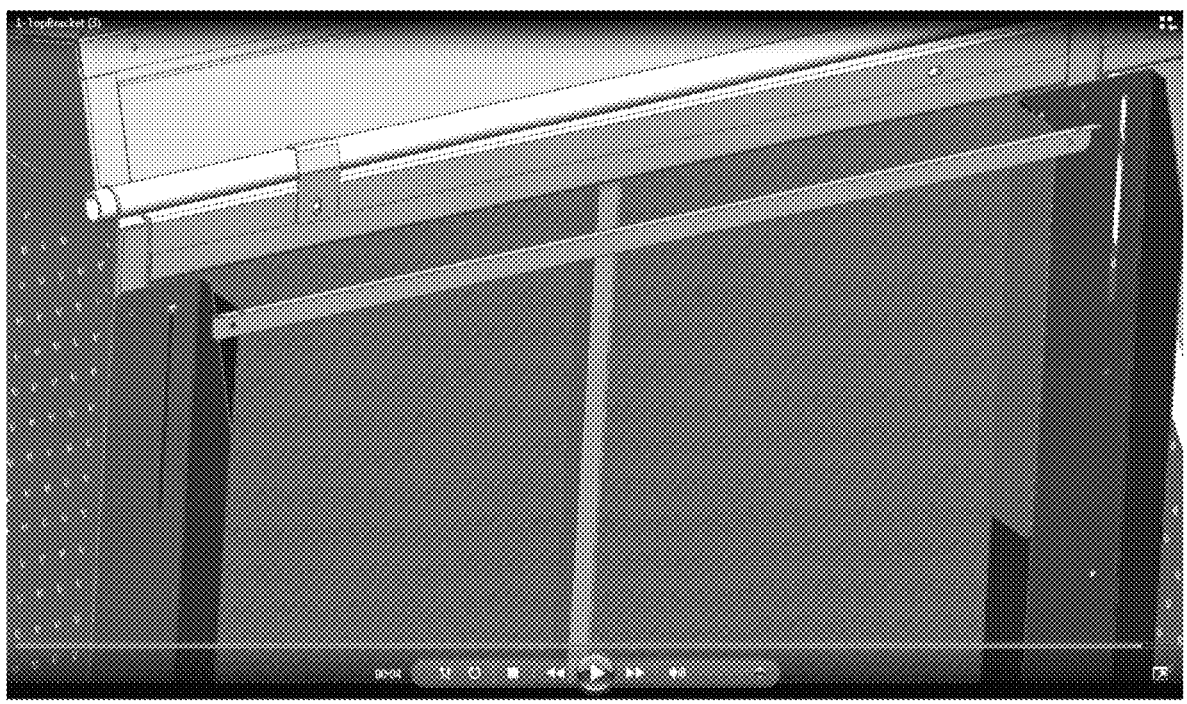
FIG. 16 shows a tighter close-up perspective view of an embodiment of the invention with the top bracket of the air pre-cool system in a second partially deployed position.

In a next step, if the top adiabatic support element is not already in the fully deployed and raised position, it will be automatically moved into that position. FIG. 14 shows the top adiabatic pad support element in the lower (preferred shipping) configuration. FIG. 15 shows the top adiabatic pad support element moving towards its fully raised and operational configuration, and FIG. 16 shows the top adiabatic pad support element having been moved into its fully raised and operational position (and optional, less preferred shipping position).

Figure 17:
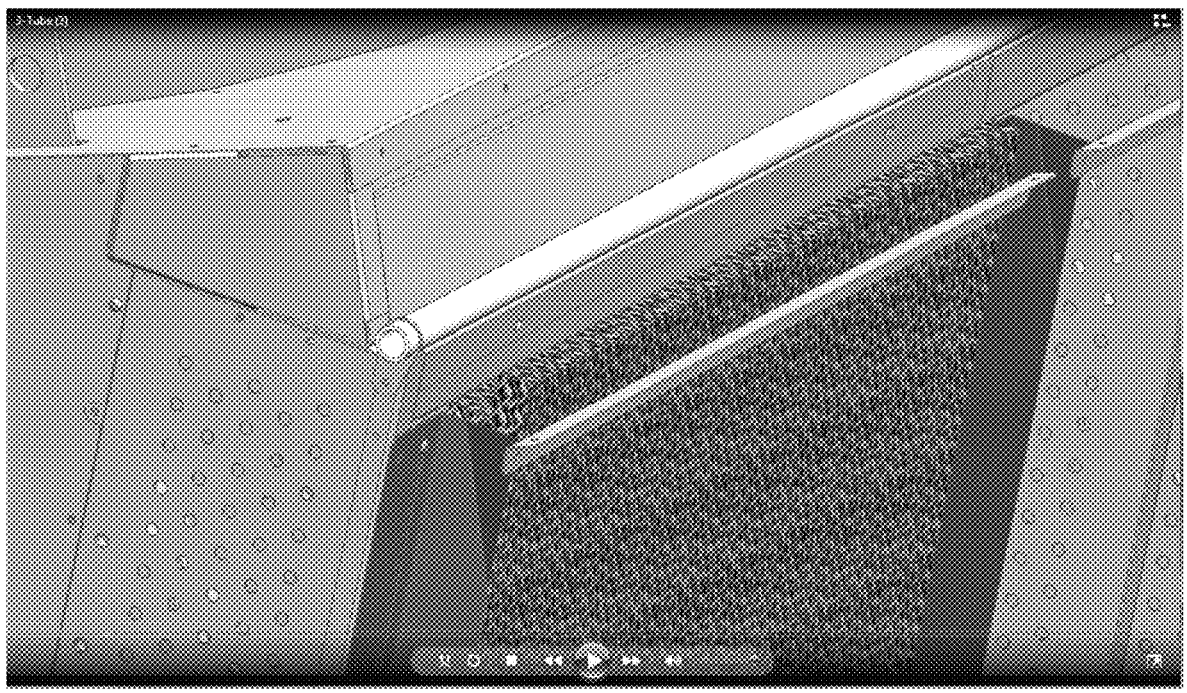
FIG. 17 shows a tighter close-up perspective view of an embodiment of the invention with the adiabatic pad and top bracket of the air pre-cool system in a fully deployed position and the top tube of the air pre-cool system in a partially deployed position.
Figure 18:
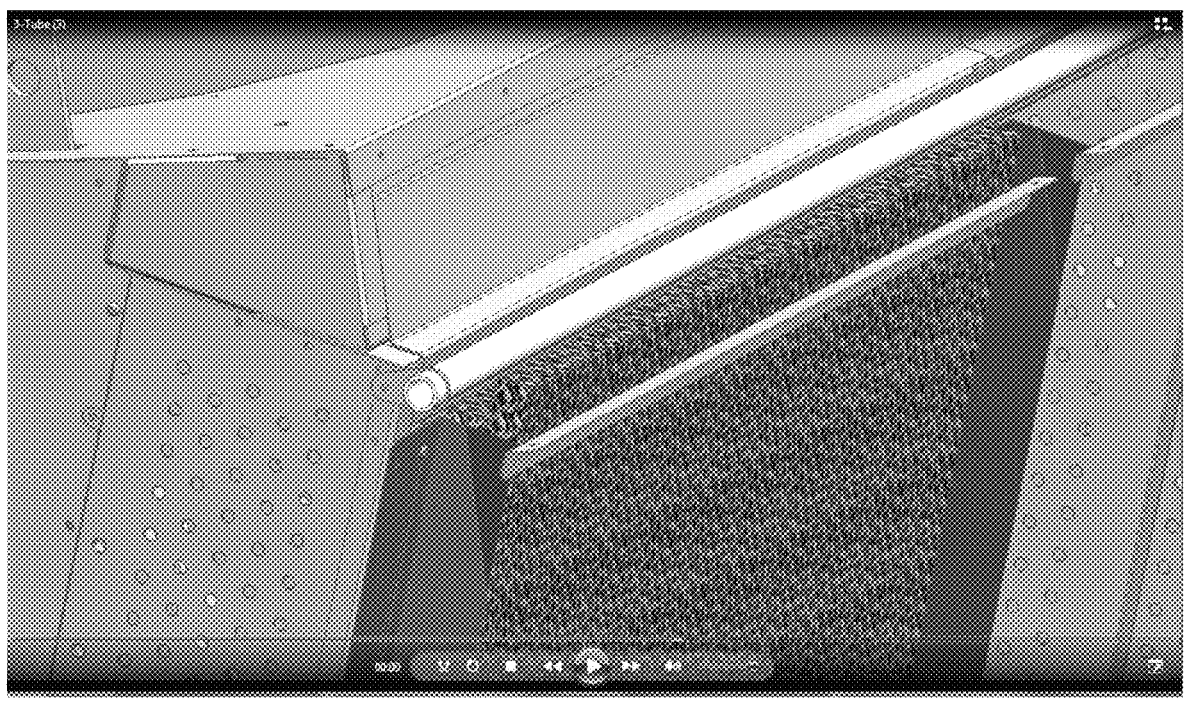
FIG. 18 shows a tighter close-up perspective view of an embodiment of the invention with the adiabatic pad and top bracket of the air pre-cool system in a fully deployed position and the top tube of the air pre-cool system in a second partially deployed position.

Once the top adiabatic pads are in operational position, and the top and intermediate adiabatic support elements are likewise in their operational positions, the water distribution tube is automatically rotated out of its shipping position into its operational position by water distribution tube positioning mechanism 23, see, e.g., FIGS. 17 and 18.

The adiabatic pad positioning mechanism, adiabatic pad support element positioning mechanisms, and the water distribution tube positioning mechanism are connected to and activated by positioning control system 17.

Figure 19:
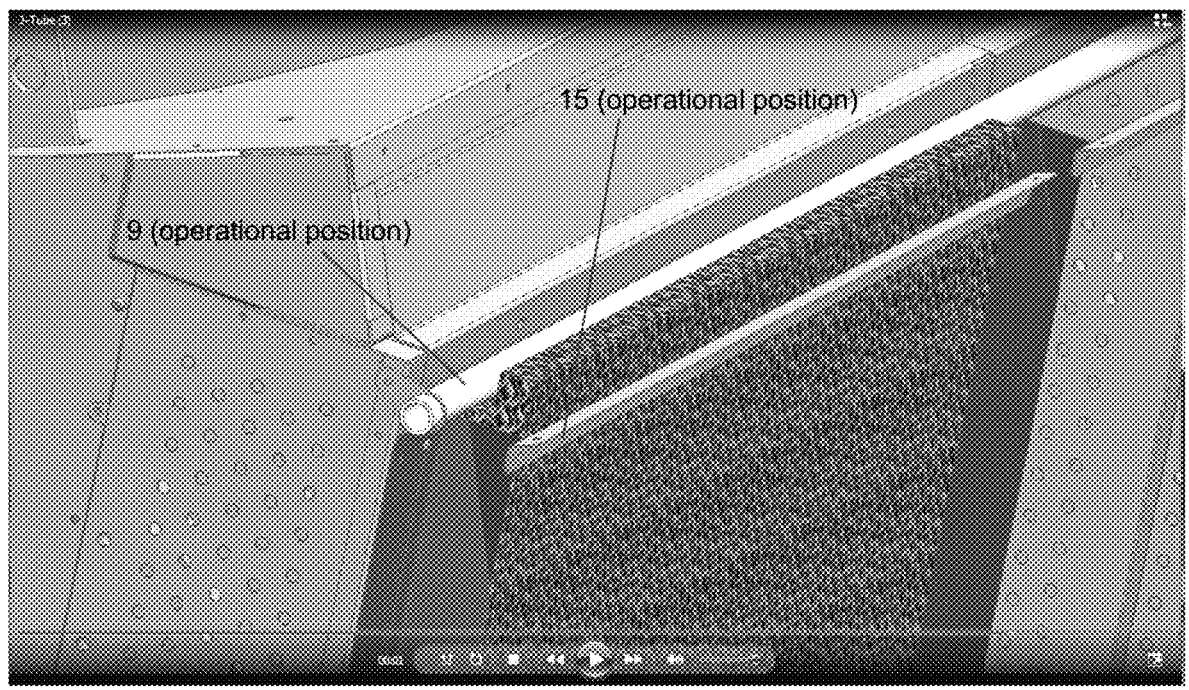
FIG. 19 shows a tighter close-up perspective view of an embodiment of the invention with the adiabatic pad, top bracket and top tube of the air pre-cool system in fully deployed positions.

FIG. 19 the top adiabatic pad, the top adiabatic pad support element bracket and the water distribution tube of the air pre-cool system in fully deployed positions, with the water distribution tube nested in a notch in the top of the adiabatic pad.

FIG. 20 is a perspective view of an integrated factory assembled air pre-cool system and air-cooled heat transfer device according to an embodiment of the invention with the air pre-cool system in the fully deployed/operational position. Once the integrated air pre-cool system is fully deployed into the operational configuration, it operates as described with respect to FIGS. 4-6.

Various mechanical and control systems for moving the elements of the air pre-cool system from the shipping positions into their operational positions are well within the ability of the person of ordinary skill to make and use and the invention is not intended to be limited to any specific mechanism or control system for doing so.

The invention claimed is:

1. A dry adiabatic cooler, comprising:
a frame:
two tube bundles arranged in said frame in a vertically oriented V-shape;
each of said two tube bundles having an inlet header and an outlet header, said inlet header configured and located to receive hot process fluid and to distribute said hot process fluid to a corresponding tube bundle and said outlet header configured and located to receive cooled process fluid from said corresponding tube bundle;
said two tube bundles each comprising a plurality of horizontally arranged finned tubes connected to adjacent tubes with tube bends;
a plurality of fans supported by said frame above said two tube bundles configured to draw air through said two tube bundles and out through a top of said plurality of fans;
a plurality of upper adiabatic pads and a plurality of lower adiabatic pads mounted in said frame adjacent to an air intake side of each said two tube bundles, said plurality of upper adiabatic pads having upper adiabatic pad shipping positions laterally adjacent respective ones of said plurality of lower adiabatic pads and upper adiabatic pad operational positions above respective ones of said plurality of lower adiabatic pads;
a water distribution system comprising one or more water distribution tubes configured and located to wet and cool said air prior to being drawn through said two tube bundles;
said water distribution tubes each having a water distribution tube shipping position and a water distribution tube operational position, said water distribution tube shipping position located adjacent said frame, and said water distribution tube operational position located above said adiabatic pads and configured to deliver water to said adiabatic pads;
a plurality of adiabatic pad crossbars each having an adiabatic pad crossbar shipping position and an adiabatic pad crossbar operational position; and
a water collection tray located below said adiabatic pads and configured to collect water draining from said adiabatic pads.

2. A dry adiabatic cooler according to claim 1, further comprising a control system configured to cause said plurality of upper adiabatic pads, said one or more water distribution tubes, and said plurality of adiabatic pad crossbars to move from respective shipping positions to respective operational positions.

* * * * *